United States Patent [19]

Cardenas-Franco et al.

[11] Patent Number: 4,623,375
[45] Date of Patent: Nov. 18, 1986

[54] SYSTEM OF SPEED CONTROL FOR GLASS ARTICLE FORMING MACHINES

[75] Inventors: Luis Cardenas-Franco; Jorge A. Heredia de la Paz, both of Monterrey, Mexico

[73] Assignee: Vitro Tec Fideicomiso, Monterrey, Mexico

[21] Appl. No.: 674,056

[22] Filed: Nov. 21, 1984

[30] Foreign Application Priority Data

Nov. 21, 1983 [MX] Mexico ............................ 199481

[51] Int. Cl.$^4$ ............................................. C03B 9/40
[52] U.S. Cl. .................................... 65/163; 65/160; 65/164; 65/DIG. 13
[58] Field of Search .......... 65/160, 163, 164, DIG. 13

[56] References Cited

U.S. PATENT DOCUMENTS

| | | | |
|---|---|---|---|
| 3,905,793 | 9/1975 | Croughwell | 65/164 X |
| 4,152,134 | 5/1979 | Dowling et al. | 65/163 |
| 4,247,317 | 1/1981 | Wood et al. | 65/163 X |
| 4,369,052 | 1/1983 | Hotmer | 65/DIG. 13 |
| 4,457,772 | 7/1984 | Haynes et al. | 65/160 |

Primary Examiner—Arthur Kellogg
Attorney, Agent, or Firm—Abelman Frayne Rezac & Schwab

[57] ABSTRACT

An improved system of speed control for glass article forming machines includes an operator's control panel which is provided with controls to feed to the system the geometry parameters of the glass article to be manufactured as well as the timing of the manufacturing cycle; a data processor capable of calculating the speed of each mechanism of the machine in response to the data received by said operator's control panel; an EPROM-erasable programmable read-only memory which is used to contain tables including sequence profiles for the opening of actuating valves and speed mechanism profiles; a table selector circuit which is coupled to said programmable memory and the said data processor to select sequence tables from said programmable memory and which is able to solve the speed equations by using the speed information that it receives from the said data processor, and which is also able to provide the starting times of the various mechanisms; a random access memory coupled to said table selector circuit and adapted to provide sequential signals from the signals obtained from the recited table selector circuit to form an operational table; a data microprocessor coupled to said random access memory in order to produce the time and speed signals starting from the operation table signals obtained from said random access memory; and a plurality of digital electromagnetic valves coupled to said microprocessor in order to receive from the same the individual respective operation commands and in order to controllably regulate the discharge of the outlet of a block of valves of the machine.

8 Claims, 3 Drawing Figures

SYSTEM OF SPEED CONTROL FOR GLASS ARTICLE FORMING MACHINES

FIELD OF THE INVENTION

The present invention relates to an improved system of speed control for glass article forming machines and specially relates to speed controls used for glass article forming machines, particularly of the I.S. type. These speed controls are used in order to calculate and put in sequence the speeds of the machines's diverse mechanisms, which are actuated in answer to the geometrical parameters of the article that is being manufactured, as well as to the time cycle used by the machines.

BACKGROUND OF THE INVENTION

The time controls, for machines that manufacture glass articles have been well known for a long time. These glass article manufacturing machines generally consist of drums which have a plurality of cams that directly and mechanically move a series of actuating valves of the individual mechanisms of the machine. These actuating valves operate the mechanisms in a predetermined sequence dictated by the programming of the manufacturing run that is being undertaken, and, the manufacturing process is subordinated to the speed of the machine which in turn is set according to the desired time cycle. It is also well-known that in this type of machine it is impossible to change any of the cams while the machine is functioning. The speed of the mechanisms is a constant and cannot be varied at will during production cycle.

As it is also well-known, time controls which consist of a timing drum provided with mechanical cams have been slowly substituted by electronic timing controls. The first of these substitutions were merely electronic circuits (without a major change with respect to their performance) which were to be substituted for the traditional drums. Later electronic circuits were developed to carry out independent functions, i.e., so that the electronic control can introduce variables with respect to the starting time and the duration of operation, as well as the speeds of operation of the different mechanisms of the machine.

In spite of the fact that the present electronic timer controls are highly efficient, and can carry out the production function at a much greater speed, these electronic timer controls do not have the capacity to determine the speed characteristics for each one of the machine's mechanisms as subordinate to the geometry of the article. It is for this reason that with such electronic timer controls, it is necessary to individually set the speed mechanisms through the use of manually operated valves.

The requirement for a fully electronic control is one which is known in the art. The intention is that by merely providing the control system with information of the parameters of the geometry of an article to be produced, as well as the production cycle desired, the control must be capable of calculating the starting times, speeds of the individual mechanisms, finishing times, and other similar functions of a glass article manufacturing machine. It should also be able to calculate the time of the desired cycle, and be capable of carrying out the operations at an adequate speed, and, with speed profiles that are also adequate to satisfy the needs of a particular geometry of the articles to be produced.

The electronic timer controls that exist in previous techniques, however, are not capable of carrying out said functions and therefore they are not satisfactory. An operative electronic control would greatly facilitate changes in speed and other functions of the various mechanisms of the glass article forming machine, particularly if speed changes could be made without the need of operator intervention, i.e., without the need that the operator himself introduce to the electronic timer control an operating table specific to a predetermined article as related to its particular geometry and its time of production.

BRIEF SUMMARY OF THE INVENTION

It is an object of the present invention to provide a speed control system for glass article forming machines that is capable of calculating an operational table for an article having a particular geometry, by the feeding to the same of the geometry parameters and the time production cycle desired for the specified article.

Another object of the present invention is to provide a speed control system for glass article forming machines which is adaptable to existing electronic controls without the need to modify their circuity or structure.

A more specific object of the present invention is to provide a speed control system which is capable of preparing operational tables for a predetermined article on the basis of the article's geometry parameters, including the production time cycle and comparison of the table thus produced with preestablished tables for the machine to be employed.

Another object of the present invention is to provide an improved system of speed control having very simple circuitry, high efficiency and speed.

According to the present invention, an improved system of speed control for glass forming mechanisms is provided, which includes an operation panel that has controls to feed to the system the geometry parameters of the glass article to be formed and the production time cycle; a data processor that is capable of calculating the speeds of each mechanism of the machine starting from the date received from said operation panel; and EPROM-erasable programmable read only memory to contain the tables for mechanisms, which include profiles that open actuating valves and speed mechanisms profiles; a table selector circuit that is coupled to said erasable programmable read only memory and to said data processor so that it can select sequence tables from the cited programmable memory and resolve the speed equations starting from the speed data it receives from the mentioned data processor and likewise capable of providing the starting times of the diverse mechanisms; a random access memory coupled to said table selector circuit and adapted to provide sequential signals which form an operation table starting from the signals obtained from the cited table selector circuit, a data microprocessor which is coupled to said random access memory in order to produce the time signals and speeds starting from the signals of the operation tables obtained from the cited random memory and order a plurality of actuating electromagnetic valves coupled to said microprocessor to receive from the same the operating respective individual commands.

BRIEF DESCRIPTION OF THE DRAWINGS

The invention will best be understood from the following description, when the same is read in relation to the attached drawings, wherein.

DETAILED DESCRIPTION OF THE DRAWINGS

Figure 1:
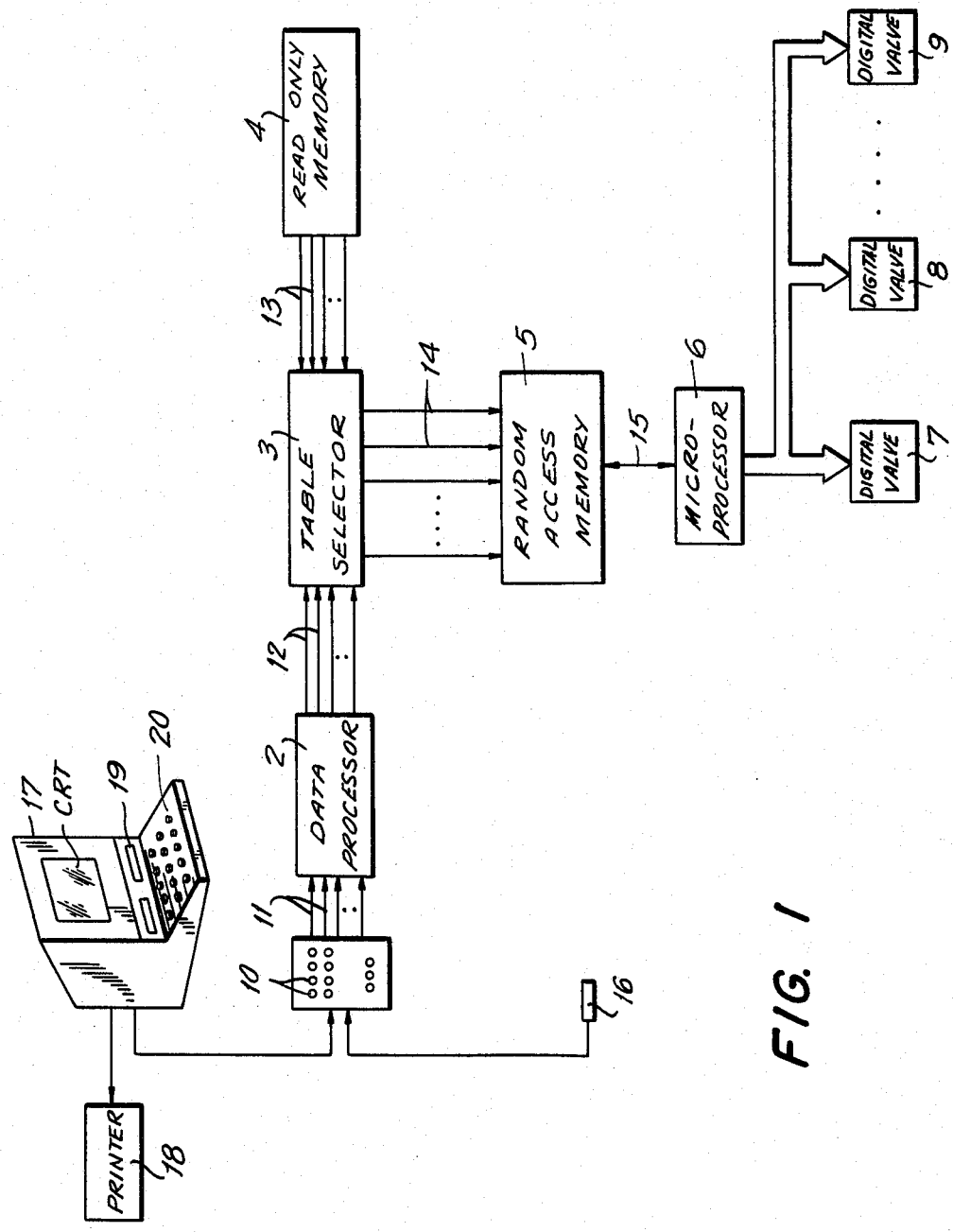
FIG. 1 is a block diagram illustrating the circuits which make up the control system of the present invention.

As shown in FIG. 1, the speed control includes an operator panel, which includes digital switches 10 through the digital switches, the operator can introduce the parameters of the geometry of the article to be manufactured, such as weight, diameter, length, height, the relationship to the length and the center of gravity, etc. The same digital switches can be used to calculate the time cycle desired, i.e. the number of glass gobs cuts per minute, as provided by a gob cut sensor 16. The operator panel includes viewers so that the operator is able to directly see the data which he is feeding.

The operator panel 1 preferably is completed by a terminal unit 17 including, a CRT screen together with its printer 18, as well as disc readers 19 or other information media and keyboard 20.

This group of apparatus permits starting of both the speed control system as well as the glass forming machine, and it can do so in an automatic way at the time the geometry data of the article (weight, length, etc.) and the time cycles of starting and end of function of the mechanisms are provided. The functioning of the data can be done by the insertion of memory discs which include the previous history of the article in the readers 19 and/or through the keyboard 20.

All of the signals produced by the digital switches 10, the discs and/or the keyboard 20, are fed through the logic channels 11, to a data processor. These data circuits contain the necessary equations to calculate the individual speeds of each one of the mechanisms of the glass article forming machine on the basis of the data fed through the channels 11.

Thus, the signals corresponding to each individual speed are fed through the logic lines 12 to a table selector circuit 3. This table selector 3 includes a comparator circuit to evaluate, based on the data fed from the logic lines 12, the operation tables, and particularly the starting time of the various mechanisms that form the glass article producing machine. For this function, said table selector circuit 3 receives signals from an erasable programmable read only memory, generally indicated at 4. The erasable programmable read only memory contains the precalculated tables for the operation of the various mechanisms of the glass article forming machine, and it thus constitutes a reference storage of those tables. The signals are sent through the logic lines 13 towards the table selector 3.

The table selector 3 evaluates the signals received from the erasable programmable read only memory 4 and compares the speed data received through the logic lines 12 of the data processor 2, to evaluate and integrate said tables with the speed data in order to prepare representative signals of the operation tables. These are sent through the logic lines 14 to a random access memory 5. This random access memory 5 constitutes a circuit which stores operation tables for the glass article forming machine.

Figure 2:
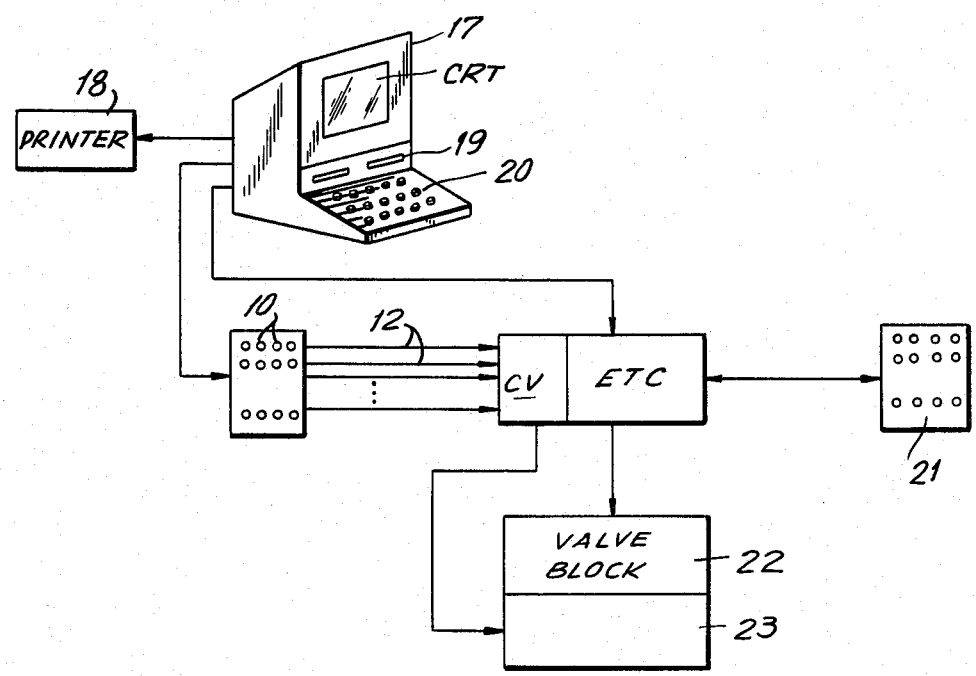
FIG. 2 is a block diagram of the system of FIG. 1, in relation to the electronic timer controls.
Figure 3:
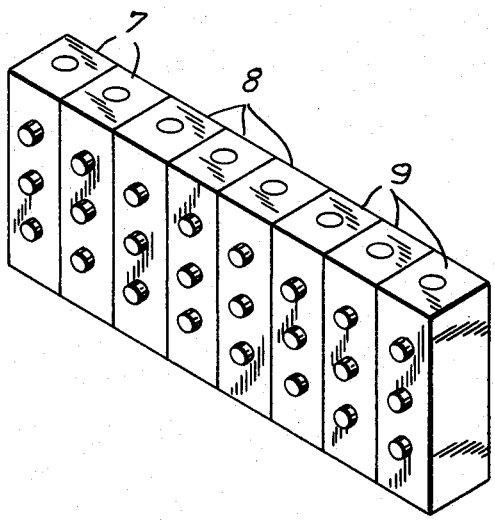
FIG. 3 is a perspective view of a digital block of valves to be controlled by the system shown in FIG. 1.

The operation tables contained in the random access memory 5 are fed through the logic lines 15 to a microprocessor 6, so that the said operation tables activate the circuits of the microprocessor 6. This is done to generate the real signals of operation of various valves, for example the digital valves 7, 8, 9, etc., which control the discharge from the valve blocks 22 of the electronic timer control ETC (FIG. 2). The signals are fed through the logic lines 16. The respective signals include the starting times as well as the speed and the speed profile of the various mechanisms which make up the glass article forming machine (not shown).

In this manner, adequate automatization of the data fed to the microprocessor 6 is carried out.

Before the development of the present invention, the speeds were set with pneumatic needle valves. The shock absorbers that were placed at the end of the run of the pneumatic pistons were similarly set with pneumatic valves. Through the use of the circuit of the present invention, the operator panel is reduced to providing a plurality of digital circuit switches in order to introduce the parameters of geometry and of the time cycles for production of a predetermined article. The parameters for the said article can easily be obtained by the operator, and, the speed with which changes can be made is quite efficient.

By use of the improved speed control of the present invention, the operator has to introduce the geometry data of the article, instead of feeding the microprocessor 6 data as to the individual speeds of at least the basic mechanisms. The microprocessor calculates the rest of the speeds and starting time of the mechanisms based on the speeds and times of starting fed by the operator.

The geometry data is easily obtainable through the use of tables or discs prepared ahead of time. Likewise, all of the times of starting, speeds of the various individual mechanisms, speed profiles of each one of the mentioned mechanisms, and the performance time of each one of them, can be prepared ahead of time, and, there is no need for the operator to introduce the data on the data on the operation tables for any predetermined article to the microprocessor 6.

This makes very easy the operation of such machines, which, because they operate at a very high speed, also need a control with a very high speed, in order not to lose valuable time when one wishes to introduce a new production cycle that manufactures a different article. The circuit control of the present invention makes possible such changes at an extraordinary speed and with excellent preciseness. For these reasons, it represents a great advantage if compared with the traditional practice of manually setting the speeds of each mechanism.

In order to simplify the speed control system of the present invention, the data processor 2, the table selector 3, the erasable programmable read only memory 4, the random access memory 5, and the microprocessor 6 can be integrated, as a CV unit (FIG. 2), to the electronic timer control ETC of any glass article forming machine of any known type. Such a machine can include timer electronic controls which substitute the traditional timer drums which operate at a predetermined velocity of the machine, or, can be electronically timed controls.

As will be appreciated, various modifications of the invention can be made within the scope of the following claims.

We claim:

1. In a glassware article forming machine of the type having forming and handling mechanisms, a valve block including pneumatic valves to actuate said mechanisms, and control means to operate said valves in order to sequentially actuate said mechanisms; a velocity control system for controlling the velocity of operation of the mechanisms of the machine, comprising:

(a) digital valve means coupled between the mechanisms and the output of the pneumatic valves of the valve block, in order to control the amount of fluid flow and thus the velocity of operation of said mechanisms;

(b) a reference table including an aperture sequence for the digital valve means in order to impart to said digital valve means the predetermined velocity profile for a given type of article to be produced; and (c) a first data processor including said reference table and which is coupled to said digital valve means in order to provide to said digital valve means command signals imparting the velocity profile for the operation of the corresponding mechanisms.

2. The velocity control system as claimed in claim 1, further comprising:

(d) data feeding means coupled to said first data processor, to feed geometry data of a given type of glassware articles to be produced and the cycle time of operation of the machine, in order for said first data processor to calculate the velocity of operation of each mechanism of the machine for said type of articles;

(e) an erasable programmable read only memory containing reference tables for every type of glassware articles to be produced, providing the corresponding aperture sequence of the digital valve means to control the velocity of operation of the mechanisms;

(f) a table selector circuit coupled to said first data processor, to receive the velocity signals of the mechanisms therefrom, and to said erasable programmable read only memory, in order to evaluate and select the operative tables for the mechanisms, corresponding to said given type of article, and combine the data therefrom with the velocity signals, to prepare final operative tables for controlling the velocity of operation of the mechanisms; and (g) a random access memory coupled to said table selector circuit and adapted to store the final operative tables prepared by said table selector circuit and transmit aperture sequential signals for said digital valve means derived from said stored operative tables; and (h) a second data processor coupled to said random access memory, to produce aperture sequence, time and velocity signals derived from the final operative tables obtained from said random access memory, and to said digital valve means to provide them the respective command signals which control the aperture sequence, time and velocity of the corresponding mechanisms.

3. An improved system of speed control for the glass article forming machines as claimed in claim 1, wherein said controls of the operator panel include a plurality of digital switches which are capable of feeding binary digits that are representative of the geometry and time cycle parameters that are needed for a predetermined article.

4. The glassware article forming machine as claimed in claim 1, wherein said controls of the operator panel include a terminal having a screen for presenting visual information, and a keyboard for feeding the information representing the geometry and operation time cycle parameters for a predetermined article.

5. The glassware article forming machine, claimed in claim 1, wherein said table selector circuit contains a comparing circuit which is capable of comparing tables obtained from said erasable programmable read only memory and solving equations of speed based on speed signals received from the said data processor, in order to prepare operation tables which are fed to said random access memory.

6. The glassware article forming machine as claimed in claim 1, wherein said erasable programmable read only memory stores tables for mechanisms which contain the sequences of the speed profile for each mechanism, as well as the actuating sequence of each one of the individual mechanisms.

7. The glassware article forming machine as claimed in claim 1, wherein said random access memory is adapted to produce sequential signals which form an operational table, and to supply the same to said microprocessor.

8. The glassware article forming machine as claimed in claim 1, wherein the data processor, the table selector circuit, the erasable programmable read only memory, the random access memory and the microprocessor are integrated as a unit into an electronic control which controls the operation of the speed of the machine through a valve block, whose discharge is controlled by the digital valves.

* * * * *